(12) United States Patent
Swineford et al.

(10) Patent No.: US 9,130,905 B2
(45) Date of Patent: Sep. 8, 2015

(54) CONTENT REVIEW WITH PROXY COMMENT MANAGEMENT

(75) Inventors: Randy L. Swineford, San Jose, CA (US); Barnaby James, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1683 days.

(21) Appl. No.: 11/522,587

(22) Filed: Sep. 18, 2006

(65) Prior Publication Data

US 2014/0033294 A1   Jan. 30, 2014

(51) Int. Cl.
  G06F 15/16 (2006.01)
  G06F 15/173 (2006.01)
  H04L 29/06 (2006.01)
  G06F 21/62 (2013.01)
  G06Q 10/10 (2012.01)

(52) U.S. Cl.
  CPC ............ H04L 63/0281 (2013.01); G06F 21/62 (2013.01); G06Q 10/10 (2013.01)

(58) Field of Classification Search
  CPC ..... H04L 63/0281; G06F 21/61; G06Q 10/10
  USPC .......................................... 709/223–226, 206
  See application file for complete search history.

(56) References Cited

U.S. PATENT DOCUMENTS

| 7,233,992 B1 * | 6/2007 | Muldoon et al. ............... 709/226 |
| 2004/0064561 A1 * | 4/2004 | Parsons et al. ................ 709/226 |

* cited by examiner

*Primary Examiner* — Daniel C Murray
*Assistant Examiner* — Clarence John
(74) *Attorney, Agent, or Firm* — Shook, Hardy & Bacon L.L.P.

(57) ABSTRACT

Techniques for content review with proxy comment management are presented. Comments associated with content review are managed separately from the content itself. Some comments are associated with participants internal to a secure network where the comments are managed while other comments are originally received from external participants located outside the secure network. The external comments are adopted by one or more of the internal participants that act as proxies for the external participants and their supplied comments. The proxy relationship permits the external comments to be added to the comments for the content review within the secure network.

13 Claims, 4 Drawing Sheets

CONTENT REVIEW WITH PROXY COMMENT MANAGEMENT

FIELD

This application relates to content management and in particular to techniques for content review with proxy comment management.

BACKGROUND

Increasingly work and communication are occurring in geographically independent and device independent manners. Advances in communications and the Internet have made the physical location of individuals and the types of devices used by those individuals largely irrelevant.

However, there are challenges in assuring security and enforcing desired communication policy in such an environment. For example, consider communication related to reviewing documents. With document review, reviewers may each add instructions or feedback for the content of a particular document under review. This feedback may be made within the document being reviewed itself. This permits recipient reviewers to see other feedback and see a history of feedback for the document. Yet, if the document is being reviewed by a reviewer that is not located within an enterprise or an organization that owns and is managing the document and its feedback, then synchronization, support, policy enforcement, and security can become problematic issues.

In other words, feedback for a document being reviewed may be managed within a local environment of an enterprise, such that it is assured of being appropriate and integrated with local participants. The appropriateness of the feedback relies on the fact that the local participants are known users to the local environment and are perhaps employees of an enterprise, which controls the local environment. The enterprise has some control over the local participant and can enforce its own policies, etc. Thus, it is likely that the local participants will be appropriate in their feedback and if they are not appropriate, then action can be taken by the enterprise against the local participants.

Integrating feedback from external participants is more problematic and more of a security and policy risk. This is so, because the local environment managing the feedback may not be capable of authenticating the true identity of external participants and may not be capable of exerting control over any inappropriate feedback. It may also be that an errant external participant maliciously riddles a document with worthless and voluminous feedback to dilute the value of any other comments included in the document. In some cases, a malicious external participant may be adept enough to embed a virus within the document having the feedback, and the virus may be capable of alluding existing virus scan software of the enterprise.

Consequently, feedback is usually limited to local participants within an enterprise and if external feedback is provided it is often manually entered and supplied by a local participant. This is time consuming and may result in valuable feedback being missed. Yet, the risk of security or policy being breached is more important to an enterprise than ensuring all feedback in a document review is captured. Thus, there has been little done to change this present situation within the industry.

Therefore, it is advantageous to provide improved techniques for reviewing content in a secure and integrated manner irrespective of whether participants are local to where the content is natively owned and managed or external to where the content is natively owned and managed.

SUMMARY

According to an embodiment, a method for proxy comment management of content is provided. At least one sender-added comment is received from a recipient. A sender of the sender-added comment is located outside a secure network and receipt of the content having the sender-added comment and the sender-added comment occurs within the secure network at the recipient. A recommendation is acquired from the recipient of the content to be a proxy for the sender. The recipient is associated with the secure network. The sender-added comment is added to a set of comments associated with the content along with an indication for the sender-added comment that the recipient is the proxy for the sender-added comment. The set of comments having the indication and the sender-added comment is managed within the secure network.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "content" refers to electronic data that is consumed by viewers on displays, devices, automated services, print-based media, or page/display-based media. So, content may refer to data associated with readable text, data associated with graphics, data associated with images, data associated with spreadsheets, data associated with video, programmatic content, scripts, or data associated with various combinations of each or all of these. Some media may be page/display or view-based, such as World-Wide Web (WWW) formatted or paged media embodied in browsers and accessible over the Internet or modified via editors. Content that is logically related to form a topic, a website, a presentation, or a publication may be referred to as a "document" or a "file."

A "comment" associated with content or a document refers to editorially supplied feedback or instructions that are supplied by a reviewer of the content or document. A comment may include text or may include other data types, such as but not limited to, links, images, video, audio, graphics, etc. The comment may be integrated within the primary data that represents the content or document or it may be carried with or associated with the primary data as separate metadata.

The electronic data associated with the content may be represented in a variety of programming, application, or data mark-up languages, such as, but not limited to, Adobe® Portable Document Format (PDF), Hypertext Mark-up Language (HTML), Extensible Mark-up Language (XML), Extensible Style Sheets Language (XSL), Word®, WordPerfect®, JAVA®, ActiveX®, Tag Image File Format (TIFF), Microsoft Excel®, Microsoft PowerPoint®, Joint Photographic Experts Group (JPEG), Graphics Interchange Format (GIF), text format, etc.

With this context, the description of various techniques and systems for aggregation and recreation of content are now described.

Figure 1:
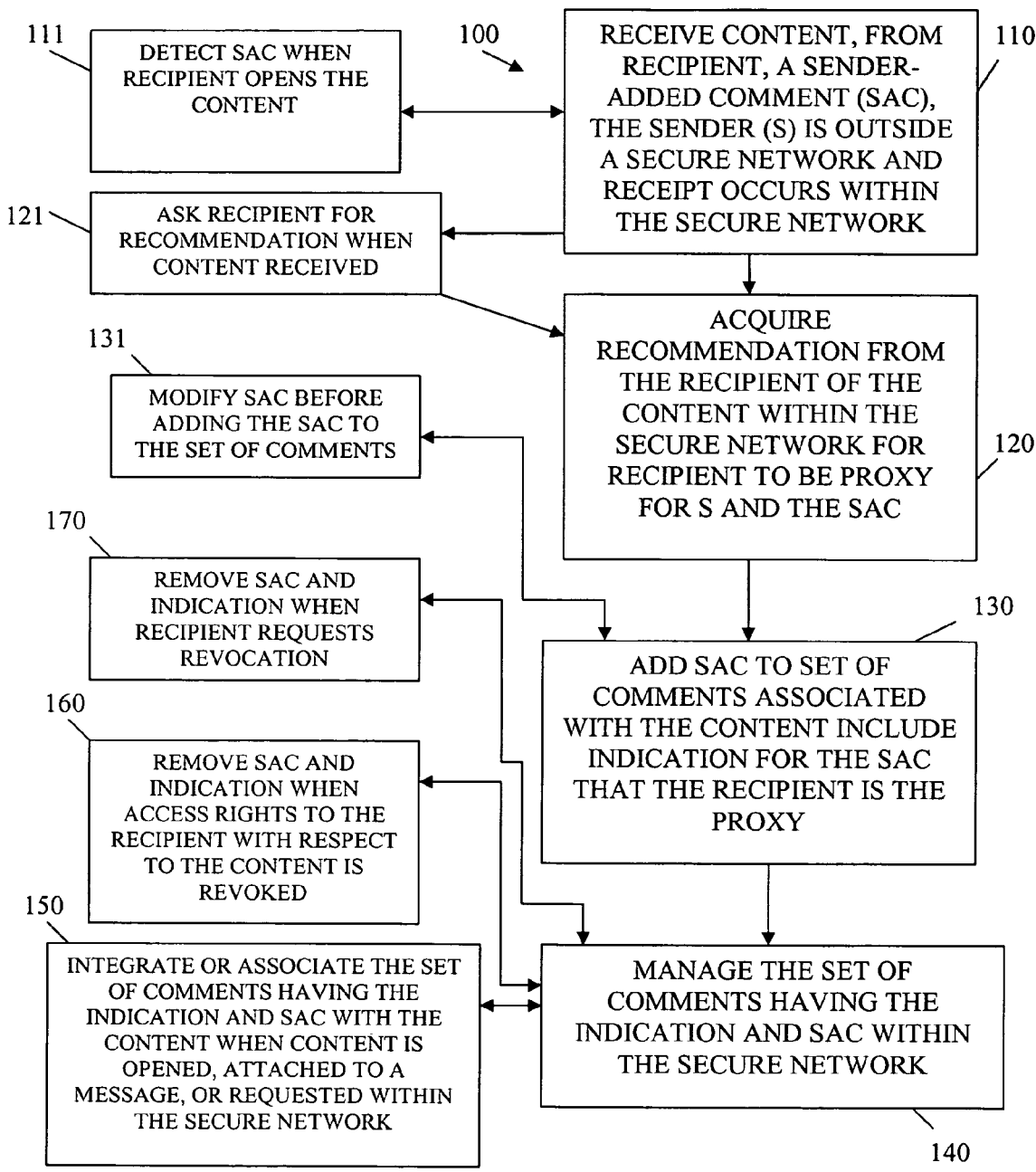
FIG. 1 is a diagram of a method for proxy comment management, according to an example embodiment of the invention.

FIG. 1 is a diagram of a method 100 for proxy comment management, according to an example embodiment of the invention. The method 100 (hereinafter "proxy comment server service") is implemented in a machine-accessible and readable medium as instructions and is accessible over a network. The instructions when accessed by a machine perform the processing depicted in FIG. 1. The network may be wired, wireless, or a combination of wired and wireless.

The proxy comment server service may be implemented on a server within a client-server architecture where it communicates with clients that run instances of a content viewer or editor (hereinafter a "content viewer or editor" is referred to as a "content editor" although it may be just a viewer in some cases). Content is opened, viewed, and/or edited via the content editor. Any modified or custom-developed content editor may be altered to achieve the interaction with the proxy comment server service described herein and below. An example, content editor Adobe® Acrobat® product, distributed by Adobe Systems Incorporated.

The proxy comment server manages comments about content separate from the content itself and from what is done with respect to the comments within the content editor. That is, when the proxy comment server service detects that content associated with comments is opened or perhaps being attached to a message or another type of content, the proxy comment server service supplies the comments to integrate with that content. So, when the content is viewed within an instance of the content editor, the comments are viewable.

The proxy comment server service operates with its instances of the content editor within a secure network. A secure network may be geographically dispersed although it does not have to be. A secure network is one in which identities of resources (e.g., users, devices, automated services, etc.) are known and trusted. The secure network may have several different modes of communication. For example, resources authenticated and operating within a firewall may not have to use secure communication protocols to communicate with one another and may not have to use encryption techniques. Simultaneously, resources communicating from outside the firewall may, according to policy, use secure communicates to interact within the secure network, such as public-private key encryption associated with Pretty Good Privacy (PGP), Secure Socket Layer (SSL) communication, and many other techniques. Before a resource is designated as belonging or being associated with the secure network, its identity is authenticated. This authentication can occur in any manner, such as but not limited to digital certificates, identifier and password combinations, biometrics, keys, etc. A resource is not associated with the secure network if it is not authenticated and known to the secure network. Non authenticated resources can still indirectly communicate with the secure network via messages to secure network resources. The proxy comment server service, instances of the content editor, and authenticated users of the secure network may all be considered resources of the secure network.

With this context, the processing and features of the proxy comment server service are now described with reference to the FIG. 1. At 110, the proxy comment server service receives a sender-added comment to content from a recipient. The recipient is a resource known inside the secure network. The recipient may be viewed as a user that a sender of the content and sender-added comment directed a message to within the secure network. The recipient may also be viewed as an internal participant reviewer of the content, whereas the sender may be viewed as an external participant reviewer of the content. The sender is not part of the secure network but the recipient is part of the secure network. That is, the sender is outside the secure network and the recipient is internal to the secure network.

Initial receipt of the content and the sender-added comment occurs at the recipient. It is noted, that in some cases the communication between the proxy comment server service and the recipient is indirect meaning actions of the recipient force communication between the recipient's instance of a content editor and the proxy comment server service. So, although it is stated that the sender-added comment is received from a recipient this may mean that the client editor of the recipient communicates the sender-added comment to the proxy comment server service on behalf of the recipient. In other cases, it may be that an Application Programming Interface (API) permits a recipient to directly communicate and interact with the proxy comment server service. Thus, communication between the recipient and the proxy comment server service can be indirect and/or direct.

In one case, at 111, the proxy comment server service detects the presence or existence of the sender-added comment when the recipient opens the content sent from the sender to the recipient within the recipient's instance of a content editor. The content editor then communicates the sender-added comment to the proxy comment server service.

At 120, the proxy comment server service acquires a recommendation from the recipient within the secure network. The recommendation is that the recipient is assuming ownership for the sender-added comment within the secure network and desires to become a proxy commenter for the sender and the sender-added comment associated with the content.

In an embodiment, at 121, the recommendation may be acquired in response to asking or prompting the recipient for the recommendation, where the recipient is asked to be the proxy once the sender-added comment is detected within the content and once the content is received within the secure network. Again, it may be that the proxy comment server service indirectly asks for the recommendation via the recipient's instance of the content editor. Alternative, the proxy comment server service, via an API, may directly interact and ask the recipient for the recommendation.

Once the recipient agrees to be the proxy for the sender-added comment and the sender, at 130, the sender-added comment is added to any existing set of comments that are already being managed for the content. In addition, the sender-added comment included within the set of comments associated with the content includes an indication that the recipient is the proxy. That is, the sender-added comment may have a variety of information added to it to identify the sender, the recipient, and/or the proxy relationship.

According to an embodiment, at 131, it may be that the proxy comment server service permits the recipient or some other resource (e.g., owner of the content, an administrator, etc.) located within the secure network to modify the sender-added comment. This can be done for a variety of reasons. For example, the sender may have supplied inappropriate or offensive language in the sender-added comment. Alternatively, the sender-added comment may have included a link to a World-Wide Web (WWW) site that is not permissibly capable of being referenced within the secure network. There may be any number of reasons why the sender-added comment may be modified.

Once the sender-added comment is added to the set of comments associated with the content, at 140, the proxy comment server service continues to manage the set of comments having the sender-added comment and the indication as to the proxy relationship between the sender and the recipient within the secure network. This management occurs for the recipient's instance of the content editor and for other instances of content editors that may open the content or that may attach the content to messages within the secure environment.

Thus, at 150, the proxy comment server service may integrate or associated the set of comments having sender-added comment with the indication identifying the proxy relationship with the content when the content is opened, attached to a message, requested by an authorized resource within the secure environment, etc. Furthermore, any subsequent comments made by other participants are updated within the set of comments within the secure environment as the proxy comment server service manages the comments associated with the content.

In an embodiment, at 160, a situation may arise where there is a desire to remove the previously integrated sender-added comment from the set of comments associated with the content. For example, the recipient that was serving as the proxy may have access rights or privileges removed within the secure network or may have permissions revoked for access to the content being reviewed. In another case, at 170, removal of the sender-added comment may occur when the recipient no longer desires to be the proxy.

Figure 2:
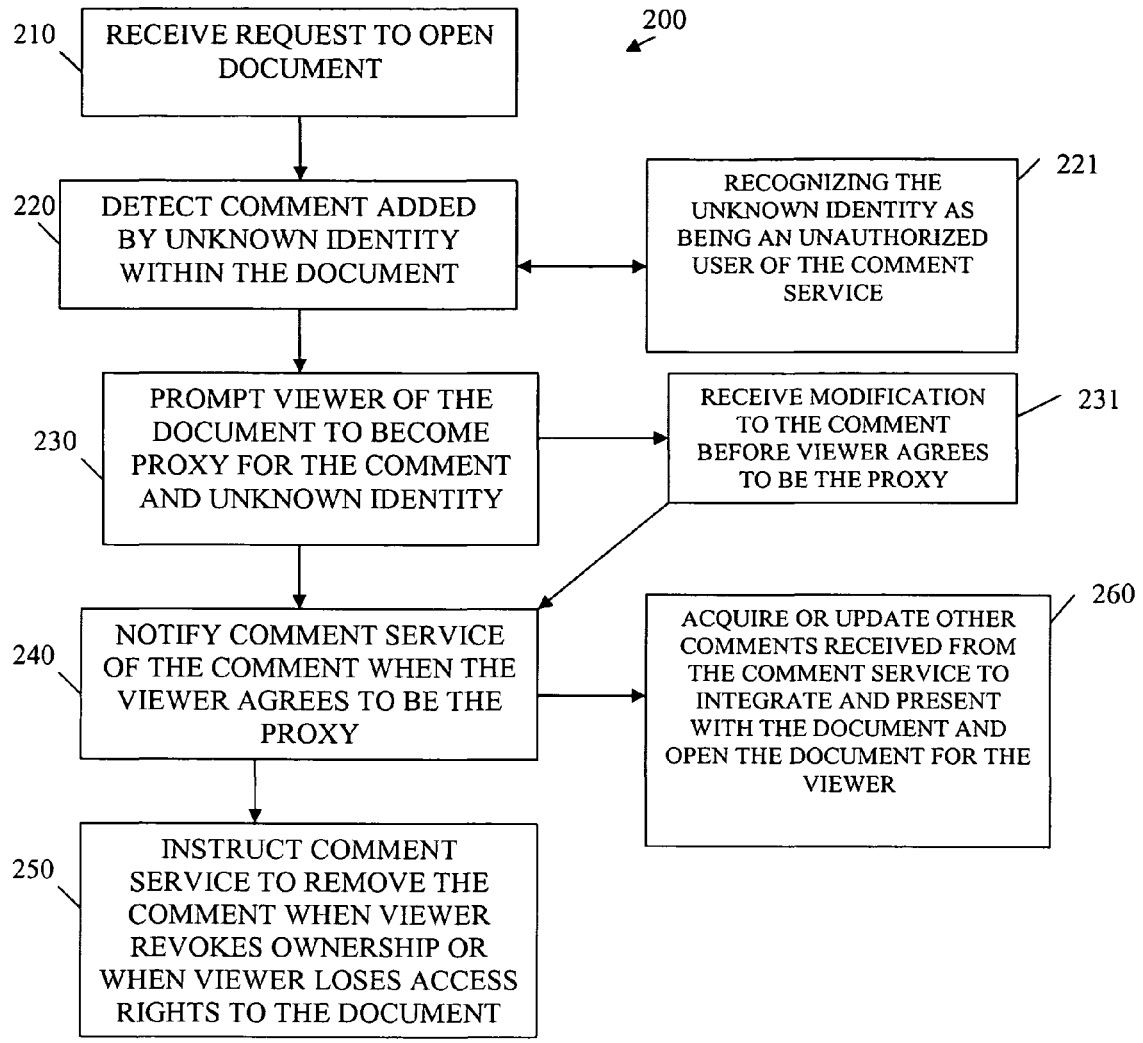
FIG. 2 is a diagram of another method for proxy comment management, according to an example embodiment of the invention.

FIG. 2 is a diagram of another method 200 for proxy comment management, according to an example embodiment of the invention. The method 200 (hereinafter "proxy comment client service") is implemented in a machine-accessible and readable medium and is accessible over a network. The network may be wired, wireless, or a combination of wired and wireless.

The proxy comment client service operates with the secure network described above with respect to the proxy comment server service represented by the method 100 of the FIG. 1. Additionally, the proxy comment client service interacts with the proxy comment server service (described herein with reference to FIG. 2 as a comment service). It is also noted that the proxy comment client service may operate in duplicate as several independent instances within the secure network. That is, the processing of the proxy comment client service may be viewed as an instance of the client editor described above with reference to the method 100 of the FIG. 1.

It is with this context that the processing and features of the proxy comment client service are now described with reference to the FIG. 2. At 210, the proxy comment client service receives a request to open a document. The document is associated with a review, where comments are being managed within a secure network by a comment service.

At 220, the proxy comment client service detects a comment added to the document, where the added comment is associated with an unknown identity. The comment may include an identifier that is associated with the user or participant that supplied the comment and that identifier is not associated with an access list associated with the document. Alternatively, at 221, it may be that the proxy comment client service consults another service to recognize that the identifier is not associated with an authorized user of the comment service. When the identifier is not recognized or unauthorized, the proxy comment client service can label it as an unknown identity. This prompts the proxy comment client service to take further action before the comment is communicated to the comment service.

Accordingly, at 230, the proxy comment client service prompts the viewer of the document to become a proxy for the comment and the unknown identity. If the viewer declines this designation, the proxy comment client service may attempt another resource to assume the proxy designation via messaging or notification techniques within the secure network. If no one assumes responsibility and desires to be the proxy, then the comment is not communicated to the comment service and may optionally be removed from the content, such that the viewer may no longer view it as well. In some cases, at 231, the proxy comment client service may permit the viewer to modify the comment before the viewer has to decide on whether to assume the proxy role. It is also noted that the proxy comment client service may permit the viewer to modify the comment even after the viewer has affirmatively assumed the proxy designation.

Assuming the proxy relationship is established, at 240, the proxy comment client service notifies the comment service. This prompts management of the comment, and other comments associated with the document, in a manner that occurs independent of any particular copy of the document present within the secure network. Example processing associated with the comment service was presented above for the proxy comment server service represented by the method 100 of the FIG. 1.

In an embodiment, at 250, it may be the case that the proxy comment client service subsequently directs the comment service to remove the comment when the viewer revokes ownership or when the viewer is detected as no longer having the proper access rights to the document.

In still more situations, at 260, the proxy comment client service may acquire or update other comments received from the comment service to integrate and present within the document for the viewer. That is, the document may have had other or updated comments added to it in the time span between when an external reviewer (unknown identity) was reviewing the document and when the viewer received the document from the external reviewer. Other authorized reviewers both internal and external to the secure network may have supplied other comments on the document. Consequently, at least as of the time the viewer opens the document or requests updates specifically, the proxy comment client service can acquire the current comments from the comment service for presentation with the content.

Figure 3:
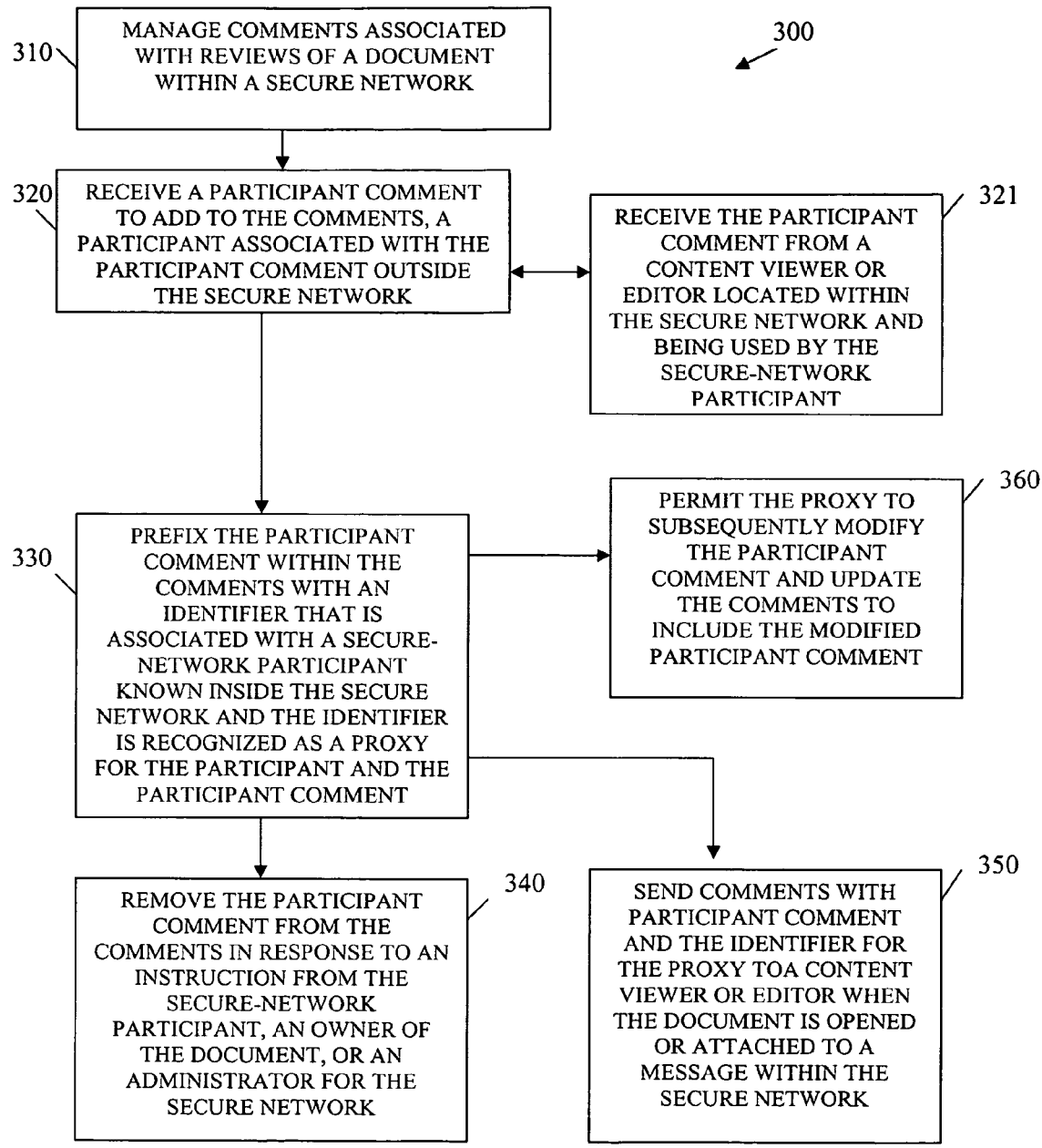
FIG. 3 is a diagram of still another method for proxy comment management, according to an embodiment of the invention.

FIG. 3 is a diagram of still another method 300 for proxy comment management, according to an embodiment of the invention. The method 300 is implemented as instructions within a machine-accessible and readable medium and is accessible over a network. The network may be wired, wireless, or a combination of wired and wireless. Moreover, the network is a secure network as described above with reference to the method 100 of the FIG. 1. The instructions present an alternative view to the processing associated with the proxy comment server service described above with reference to the method 100 of the FIG. 1.

The instructions may be stored on removable media and the removable media may be interfaced to a machine where the instructions are uploaded and processed to perform the processing depicted in FIG. 3. Alternatively, the instructions may be prefabricated within memory and/or storage of a machine and executed. In still other cases, the instructions may be downloaded from one network machine to another network machine and processed. In still more cases, the instructions may be executed remotely on one network machine at the direction of another network machine or its services.

At 310, the instructions manage comments associated with reviews of a document within a secure network. The secure network was described above with reference to the method 100 of the FIG. 1. The comments may be received from a variety of document reviewers (participants). The comments may be integrated or associated with the document dynamically or on demand. Moreover, the instructions manage the comments separate from any copy of the document that may be present within the secure network.

At 320, the instructions receive a participant comment to add to the comments being managed for the document. The participant is associated with the participant comment is located outside or is not associated with the secure network. According to an embodiment, at 321, the instructions may receive the participant comment from a content editor located within the secure network interacting with a secure-network participant. The document having the participant comment is received by the secure-network participant within the secure network and opened by an instance of the content editor and the content editor then communicates the existence of the participant comment and an identifier for the participant to the instructions.

Once the participant comment is identified, at 330, the instructions prefix the participant comment within the other comments being managed for the document with an identifier associated with the secure-network participant (known inside the secure network). The identifier is recognized as a proxy for the participant and the participant comment. As an example, consider a secure-network participant SNP and an external participant EP, the comment may appear as follows: "<SNP as Proxy for EP>Nice work on the presentation Barnaby." It is understood that the format shown is for purposes of illustration and comprehension and that embodiments of the invention is not limited to any particular format.

In an embodiment, at 340, the instructions may also remove the participant comment from the comments in response to an instruction from the secure-network participant, an owner of the document, or an administrator for the secure network. Further, the participant comment may be removed depending upon a variety of manually communicated instructions or automated detected events.

At 350, it may also be the case that the instructions automatically send the comments having the participant comment with the identifier for the proxy relationship to a different instance of the content editor within the secure network. This may occur in a variety of situations, such as when another secure-network participant attempts to open a copy of the document, attempts to attach a copy of the document to a message, specifically requests an update of the comments for a copy of the document, and the like.

Additionally, at 360, the instructions may permit the proxy (secure-network participant) to subsequently modify the participant comment and update the modified comment within the comments being managed for the document.

Figure 4:
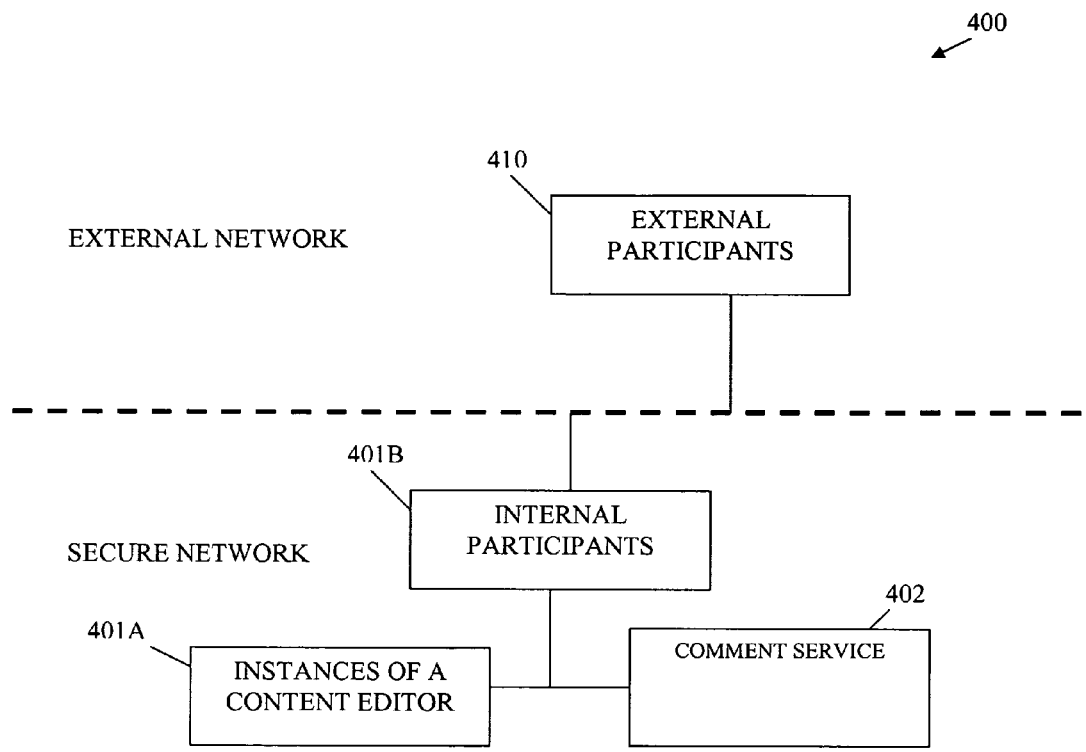
FIG. 4 is a diagram of a proxy comment management system, according to an example embodiment of the invention.

FIG. 4 is a diagram of a proxy comment management system 400, according to an example embodiment of the invention. The proxy comment management system 400 is implemented in a machine-accessible and readable medium and is optionally accessible over a network. The network may be wired, wireless, or a combination of wired and wireless. Furthermore, the network is secure as described above with reference to the method 100 of the FIG. 1. According to an embodiment, the proxy comment management system 400 implements, among other things, the methods 100, 200, and 300 depicted and described within the contexts of the FIGS. 1-3.

The proxy comment management system 400 includes one or more instances of a content editor 401A and a comment service. Each of these will now be discussed in turn.

The content editor 401A may be viewed as a content viewer/editor that permits a document to be viewed, navigated, and/or edited. One aspect of the content editor 401A is that it permits comments from a variety of participants 401B to be integrated with the document being viewed or edited. The content editor 401A resides within a secure network. It is noted that internal participants 401B to the secure network may each have their own or may each have multiple instances of the content editor executing at any one time.

When a document associated with a format of the content editor 401A is opened, perhaps even attached to a message, or even integrated into another service, the content editor 401A is invoked automatically to handle the document.

In one situation, the document is sent via electronic mail or instant messaging from a particular external participant 410 to a particular internal participant 401B. When the document is received within the secure environment and the internal participant 401B attempts to handle or view the document in some manner, a first instance of the content editor 401A associated with the particular internal participant 410 is invoked for processing.

The first instance of the content editor 401A that is invoked detects that the document includes an external comment added by the sending external participant 410. The receiving internal participant 401B is asked to vouch for the external comment and the sending external participant 410. If this occurs, then the first instance of the content editor 401A communicates the external comment and the proxy relationship, which the receiving internal participant 401B has agreed to assume vis-à-vis external comment and the sending external participant 410, to the comment service 402.

Example processing associated with instances of the content editor 401A was presented above with respect to the proxy comment client service represented by the method 200 of the FIG. 1.

The comment service 402 also operated within the secure network and interacts with instances of the content editor 401A and perhaps directly with internal participants 4011B. The comment service receives the external comment and the proxy designation from the first instance of the content editor 401A (according to the running example illustrated above with respect to the processing of the content editor 401A). In response to this information, the comment service 402 updates any previous comments being managed for the document with the external comment along with an identifier of the receiving internal participant 401B that indicates the internal participant 401B has taken ownership for the external comment on behalf of the sending external participant 410 for purposes of reviews associated with the document within the secure network.

Example processing associated with the comment service 402 was presented above with respect to the methods 100 and 300 of the FIGS. 1 and 3, respectively.

According to an embodiment, a separate and second instance of the content editor 401A may be interacting with a different internal participant 401B and may have another copy of the document. Thus, when the document is open, integrated, and/or attached the second instance of the content editor 401A requests the comments from the comment service 402. In response, the comment service 402 supplies the previous comments having the external comment along with the proxy identifier indicating the identity of the internal participant 401B who is assuming ownership for the sending external participant 410 and the corresponding external comment.

In other embodiment, the comment service 402 may automatically integrate the previous comments having the external comment and proxy designation with the document when it detects the document is being attached to a message or another service.

The comment service 402 may also remove the external comment from the previous comments being managed for the document when instructed to do so by an instance of the content editor 401A. Additionally, the comment service 402 may edit the external comment within the updated previous comments in response to an instruction to do so that is received from an instance of the content editor 401A.

It is noted that although this disclosure has discussed operations in terms of a secure network, that some aspects of what is considered a secure network may be altered such that the secure network is with reference to the document and authorized reviewers of the document. That is, the secure network may be viewed as being authorized reviewers of the document, such that an external participant or an unauthorized participant is a participant that is not part of an access list that is considered a reviewer for the document. So, users within the same environment or firewall where comments are managed for a document may include some users that are within the secure network, if those users are authorized reviewers of the document, while the environment may include other users that are not within the secure network, if those users are not authorized reviewers of the document. In other words, the designation of what is considered a secure network may be done from the typical perspective of a firewall environment or from one where users are authenticated within the firewall environment. Alternatively, the designation of what is considered a secure network may be done from the perspective of who is authorized to review and supply comments to the document. Thus, it is to be understood that the phrase "secure network" may be from the traditional perspective or may be from a document access right perspective.

It is also noted that an external reviewer or an external and non secure participant may actually transition and become a secure participant or internal reviewer for the secure network. This can occur when the external reviewer is granted or given access to the secure network or there is a change in their network connectivity (e.g., working remotely).

Also, a variety of techniques may be used to determine that a comment originates with an external reviewer. For instance, a commenter may have never submitted a comment or the comments being sent to an internal reviewer are newer than the most recent comments submitted. To mitigate synchronization between devices, a most recent time modification may be embedded in the comments that are sent. The time stamps may then be used to achieve proper or desired synchronization.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method implemented in a non-transitory machine-readable storage medium and executed by a server, the method comprising:
   receiving, at the server, at least one sender-added comment from a recipient, wherein a sender of the sender-added comment is located outside a secure network, and initial receipt of content associated with the sender-added comment and the content occurs within the secure network at the recipient, and the sender-added comment is editorially supplied feedback or instructions supplied by the sender as a reviewer of the content;
   acquiring, by the server, a recommendation from the recipient of the content to be a proxy for the sender, wherein the recipient is associated with the secure network, and the proxy indicating that the recipient has taken ownership for the sender-added comment on behalf of the sender for purposes of review within the secure network;
   adding, by the server, the sender-added comment to a set of comments associated with the content along with an indication for the sender-added comment that the recipient is the proxy for the sender-added comment; and
   managing, by the server, the set of comments having the indication and the sender-added comment within the secure network, the sender-added comment with the indication managed separately from the content and supplied for integration with the content when the content is opened or attached to a message or another type of content.

2. The method of claim 1, wherein adding further includes modifying the sender-added comment before adding to the set of comments.

3. The method of claim 1 further comprising, integrating or associating, by the server, the set of comments having the indication and the sender-added comment with the content when the content is opened within a content viewer or editor within the secure network, when the content is attached to a message service within the secure network, or when a request is made within the secure network for the set of comments.

4. The method of claim 1, wherein receiving further includes asking the recipient for the recommendation when the content is received with the sender-added comment.

5. The method of claim 4 further comprising, detecting, by the server, the sender-added comment when the recipient opens the content.

6. The method of claim 1 further comprising, removing, by the server, the sender-added comment and the indication when the recipient requests revocation of ownership to the sender-added comment.

7. The method of claim 1 further comprising, removing, by the server, the sender-added comment and the indication when access rights to the recipient with respect to the content is revoked within the secure network.

8. A method implemented in a non-transitory machine-readable storage medium and executed by a client, the method comprising:

receiving, at the client, a request to open a document;

detecting, by the client, a comment added by an unknown identity within the document, the comment is an editorially supplied feedback or instruction provided by the unknown identity as a reviewer of content for the document;

prompting, by the client, a viewer of the document to become a proxy for the comment and the unknown identity, the viewer being associated with a secure network, and the proxy indicating that the viewer has taken ownership for the comment on behalf of the unknown identity for purposes of review within the secure network; and notifying, by the client, a comment service of the comment when the viewer agrees to be the proxy, the comment service managing the comment separately from the content of the document and integrating the comment with the content of the document when the document is opened along with an indication that the viewer is acting as a proxy for the unknown identity.

9. The method of claim 8 further comprising, receiving, at the client, a modification to the comment before the viewer agrees to be the proxy.

10. The method of claim 8, wherein notifying further includes modifying the comment by prefixing the comment with the a viewer identity for the viewer indicating that the viewer is the proxy or has taken ownership of the comment for the unknown identity.

11. The method of claim 8 further comprising, instructing, by the client, the comment service to remove the comment when the viewer renounces or revokes ownership or when the viewer loses access rights to the document.

12. The method of claim 8 further comprising:

acquiring or updating, by the client, other comments from the comment service to integrate and present with the document; and opening, by the client, the document for the viewer.

13. The method of claim 8, wherein detecting further includes recognizing the unknown identity as being an unauthorized user of the comment service.

* * * * *